United States Patent
Chou et al.

(10) Patent No.: US 10,542,323 B2
(45) Date of Patent: *Jan. 21, 2020

(54) REAL-TIME MODIFIABLE TEXT CAPTIONING

(71) Applicant: International Business Machines Corporation, Armonk, NY (US)

(72) Inventors: Philip J. Chou, Poughkeepsie, NY (US); Rajaram B. Krishnamurthy, Pleasant Valley, NY (US); Christine D. Mikijanic, Monroe, NY (US); Conner W. Simmons, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/844,541

(22) Filed: Dec. 16, 2017

(65) Prior Publication Data

US 2018/0199112 A1     Jul. 12, 2018

Related U.S. Application Data

(63) Continuation of application No. 15/403,289, filed on Jan. 11, 2017.

(51) Int. Cl.
*H04N 21/462*     (2011.01)
*H04N 21/488*     (2011.01)
(Continued)

(52) U.S. Cl.
CPC ..... *H04N 21/4884* (2013.01); *H04N 21/4316* (2013.01); *H04N 21/4394* (2013.01);
(Continued)

(58) Field of Classification Search
CPC ......... H04N 21/4884; H04N 21/44008; H04N 21/4584; H04N 21/8133
See application file for complete search history.

(56) References Cited

U.S. PATENT DOCUMENTS

| 8,736,761 B2 | 5/2014 | Kendall et al. |
| 8,947,596 B2 | 2/2015 | Schmidt |

(Continued)

FOREIGN PATENT DOCUMENTS

| WO | 2014152387 A1 | 9/2014 |
| WO | 2015080856 A1 | 6/2015 |

OTHER PUBLICATIONS

U.S. Appl. No. 15/856,141, filed Dec. 28, 2017.

(Continued)

*Primary Examiner* — Mulugeta Mengesha
*Assistant Examiner* — Charles N Hicks
(74) *Attorney, Agent, or Firm* — Alexander G. Jochym; Edward J. Wixted, III; William H. Hartwell

(57) ABSTRACT

An approach to modifying text captioning is provided, comprising receiving, by a captioning modifier program, input data associated with a video stream, analyzing, by the captioning modifier program, the input data, altering, by the captioning modifier program, text captioning associated with the video stream to indicate eventful aspects based on an analysis of the input data and generating, by the captioning modifier program, supplementary information associated with the video stream based on the analysis and providing the supplementary information as an addition to the text captioning.

7 Claims, 4 Drawing Sheets

(51) Int. Cl.
    *H04N 21/44*     (2011.01)
    *H04N 21/81*     (2011.01)
    *H04N 21/485*     (2011.01)
    *H04N 21/431*     (2011.01)
    *H04N 21/439*     (2011.01)

(52) U.S. Cl.
    CPC ... *H04N 21/44008* (2013.01); *H04N 21/4854* (2013.01); *H04N 21/8133* (2013.01)

(56) References Cited

U.S. PATENT DOCUMENTS

| | | | |
|---|---|---|---|
| 9,055,274 | B2 | 6/2015 | Casagrande |
| 9,124,910 | B2 | 9/2015 | Kellicker |
| 9,800,951 | B1 * | 10/2017 | Carlson .............. G06F 16/7867 |
| 2002/0104096 | A1 | 8/2002 | Cramer et al. |
| 2007/0011012 | A1 * | 1/2007 | Yurick .................. G10L 15/26 |
| | | | 704/277 |
| 2010/0232762 | A1 * | 9/2010 | Kendall ............. H04N 5/44513 |
| | | | 348/77 |
| 2010/0259676 | A1 | 10/2010 | Swan |
| 2011/0018966 | A1 | 1/2011 | Kitazato |
| 2011/0145068 | A1 | 6/2011 | King et al. |
| 2013/0071090 | A1 * | 3/2013 | Berkowitz .......... H04N 9/7921 |
| | | | 386/248 |
| 2013/0141551 | A1 | 6/2013 | Kim |
| 2013/0246040 | A1 | 9/2013 | DeLuca et al. |
| 2015/0040156 | A1 | 2/2015 | Lenzi et al. |
| 2015/0109532 | A1 | 4/2015 | Lewis et al. |
| 2016/0231889 | A1 * | 8/2016 | Voss ....................... H04N 5/278 |

OTHER PUBLICATIONS

Chou et al., "Real-Time Modifiable Text Captioning", U.S. Appl. No. 15/403,289, filed Jan. 11, 2017, 30 pages.

IBM, Appendix P, list of patents or patent applications treated as related, filed herewith, 2 pages.

* cited by examiner

REAL-TIME MODIFIABLE TEXT CAPTIONING

BACKGROUND

The present invention relates generally to the field of text captioning, and more particularly to cognitive analysis of text captioning.

Text captioning is the addition text to a video stream, e.g., a live or prerecorded video stream on television (TV) or a communication network, such as the Internet. Text captioning, including closed captioning, subtitles, and the like, can be used to present character dialogue and contextual information associated with the events of a video stream in real time. As an accessibility feature, text captioning is useful for those with disabilities or impairments (such as deafness) or otherwise a useful feature for viewers in a noisy environment who may have difficulty hearing the audio associated with a video stream.

Cognitive computing refers to computer processing that simulates human thinking and cognition processes. Cognitive computing involves techniques such as data mining, pattern recognition, machine learning, natural language processing and the like to analyze input data and discover new insights and solutions. With the more input data that is processed, the computational processes used to analyze input data by cognitive computing systems can become more refined and effective. Cognitive computing systems can find application in the field of text captioning in video streams for enhancing formatting and improving the quality of the information conveyed through text captioning.

SUMMARY

According to one embodiment of the present invention, a method for modifying text captioning is provided, the method comprises receiving, by a captioning modifier program, input data associated with a video stream; analyzing, by the captioning modifier program, the input data; altering, by the captioning modifier program, text captioning associated with the video stream to indicate eventful aspects based on an analysis of the input data; and generating, by the captioning modifier program, supplementary information associated with the video stream based on the analysis and providing the supplementary information as an addition to the text captioning. A corresponding computer program product and computer system are also disclosed herein.

DETAILED DESCRIPTION

Embodiments of the present invention recognize text captioning (e.g., closed captioning, subtitles, etc.) provided by streaming media content providers is often limited in formatting and structure. For example, the information is often displayed along the bottom edge of the screen and only depicts at most two rows of text at a time, typically in a fixed font and size. While text captioning generally enhances the viewing experience of those with hearing impairments or in noisy environments, embodiments of the present invention acknowledge that text captioning can be improved via real-time processing to further enhance viewer experience and comprehension.

Viewer experience would be greatly enhanced with real-time image and audio processing that would be able to capture emotions, changes in volume, or other important aspects of scenes in a video stream in order to modify the text captioning in a meaningful way, so viewers can have a better understanding of what is being portrayed on screen. Further, the text captioning in a video stream may be blocking important aspects or images on the screen. Thus, an intelligent system with the capability to dynamically move text captioning about the screen to avoid this would also be a useful feature. Embodiments of the present invention therefore provide a solution to intelligently, automatically modify text captioning to address these issues, among others.

In describing embodiments in detail with reference to the figures, it should be noted that references in the specification to "an embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, describing a particular feature, structure or characteristic in connection with an embodiment, one skilled in the art has the knowledge to affect such feature, structure or characteristic in connection with other embodiments whether or not explicitly described.

Figure 1:
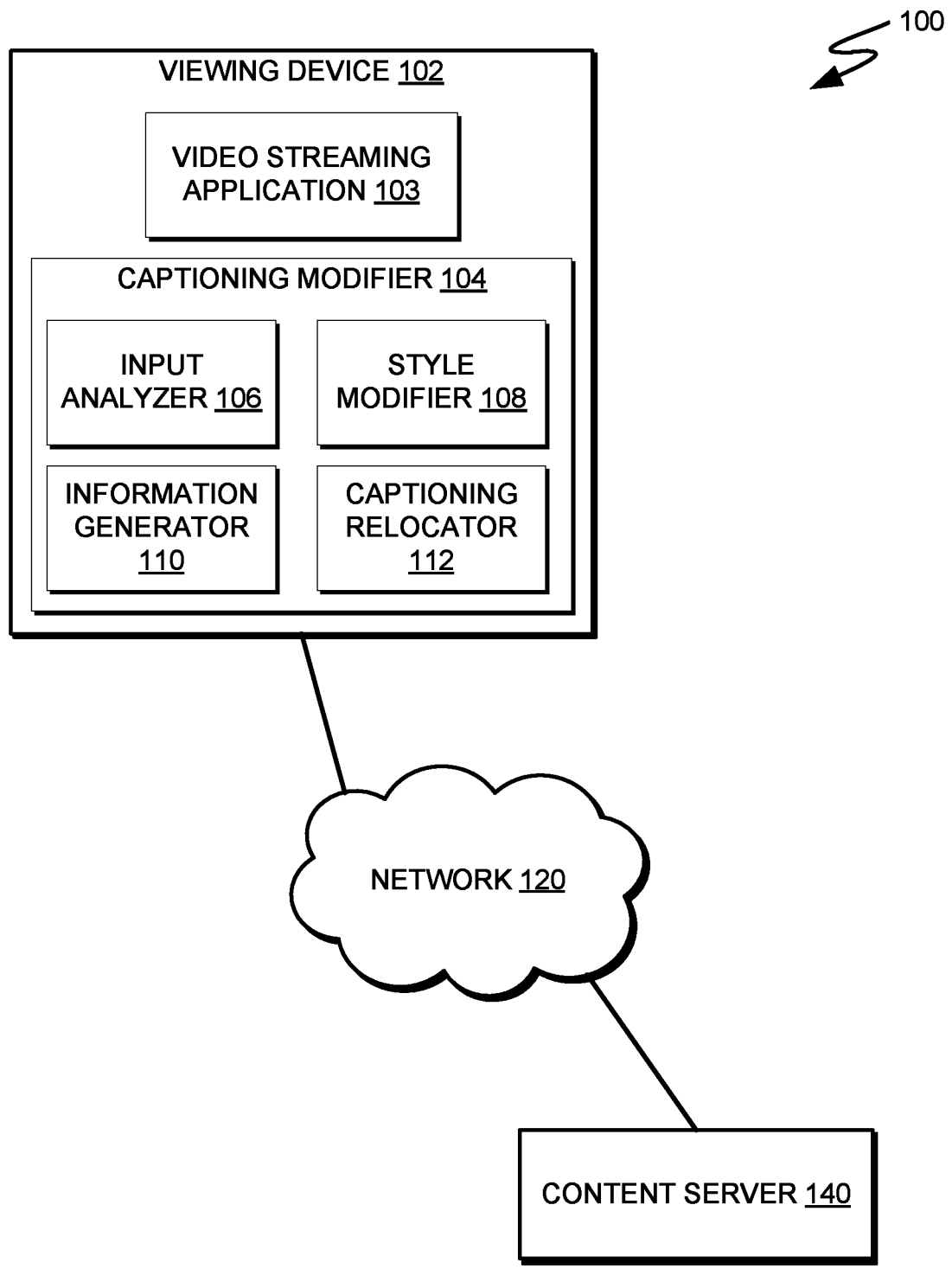
FIG. 1 is a functional block diagram illustrating a distributed data processing environment, in accordance with an embodiment of the present invention.

The present invention will now be described in detail with reference to the figures. FIG. 1 is a functional block diagram illustrating a distributed data processing environment 100, in accordance with one embodiment of the present invention. Distributed data processing environment 100 comprises viewing device 102 and content server 140, interconnected over network 120.

Viewing device 102 can be a laptop computer, tablet computer, netbook computer, personal computer (PC), a desktop computer, a personal digital assistant (PDA), a smart phone, a smart television (TV) or any programmable electronic device capable of communicating with content server 140 via network 120. Viewing device 102 comprises video streaming application 103 and captioning modifier 104 for modifying text captioning to enhance viewer experience and comprehension. Video streaming application 103 can be, but is not limited to, a web browser or a streaming media service application used to watch streaming media content, e.g., movies, videos, TV shows and the like, on demand. Video streaming application 103 provides the accessibility feature of text captioning such as, but not limited to, closed captioning or subtitles, for providing textual information associated with video streams that are viewed. In some embodiments, video streaming application 103 comprises captioning modifier 104, i.e., captioning modifier 104 is built into video streaming application 103.

Captioning modifier 104 comprises input analyzer 106, style modifier 108, information generator 110 and captioning relocator 112. Input analyzer 106 is a component for receiving and analyzing audio and visual input, from video streaming application 103, associated with streaming video content. Input analyzer 106 can be embodied as a cognitive computing system, capable of analyzing the input to intelligently determine how to modify text captioning, which can be done in conjunction with personal user preferences and custom settings as will be discussed in greater detail subsequently.

Style modifier 108 is a component which communicates with input analyzer 106 to alter the style and/or format of text captioning. Information generator 110 is a component which communicates with input analyzer 106 to generate and display additional textual information for improving user comprehension of streaming video content. Captioning relocator 112 is a component which communicates with input analyzer 106 to dynamically move, i.e., relocate, text captioning about a display screen associated with viewing device 102. This text captioning relocation provides a mechanism for improving viewer experience by moving text captioning to parts of the display screen which minimize the extent to which the text captioning blocks important aspects of a scene at any given time.

In various embodiments of the present invention, content server 140 can be a laptop computer, tablet computer, netbook computer, personal computer (PC), a desktop computer or any programmable electronic device capable of communicating with viewing device 102 via network 120. Content server 140 represents a system used to provide and distribute content, e.g., streaming media content viewable via video streaming application 103.

Network 120 can be, for example, a local area network (LAN), a wide area network (WAN) such as the Internet, or a combination of the two, and can include wired, wireless, or fiber optic connections. In general, network 120 can be any combination of connections and protocols that will support communications between viewing device 102 and content server 140.

Figure 4:
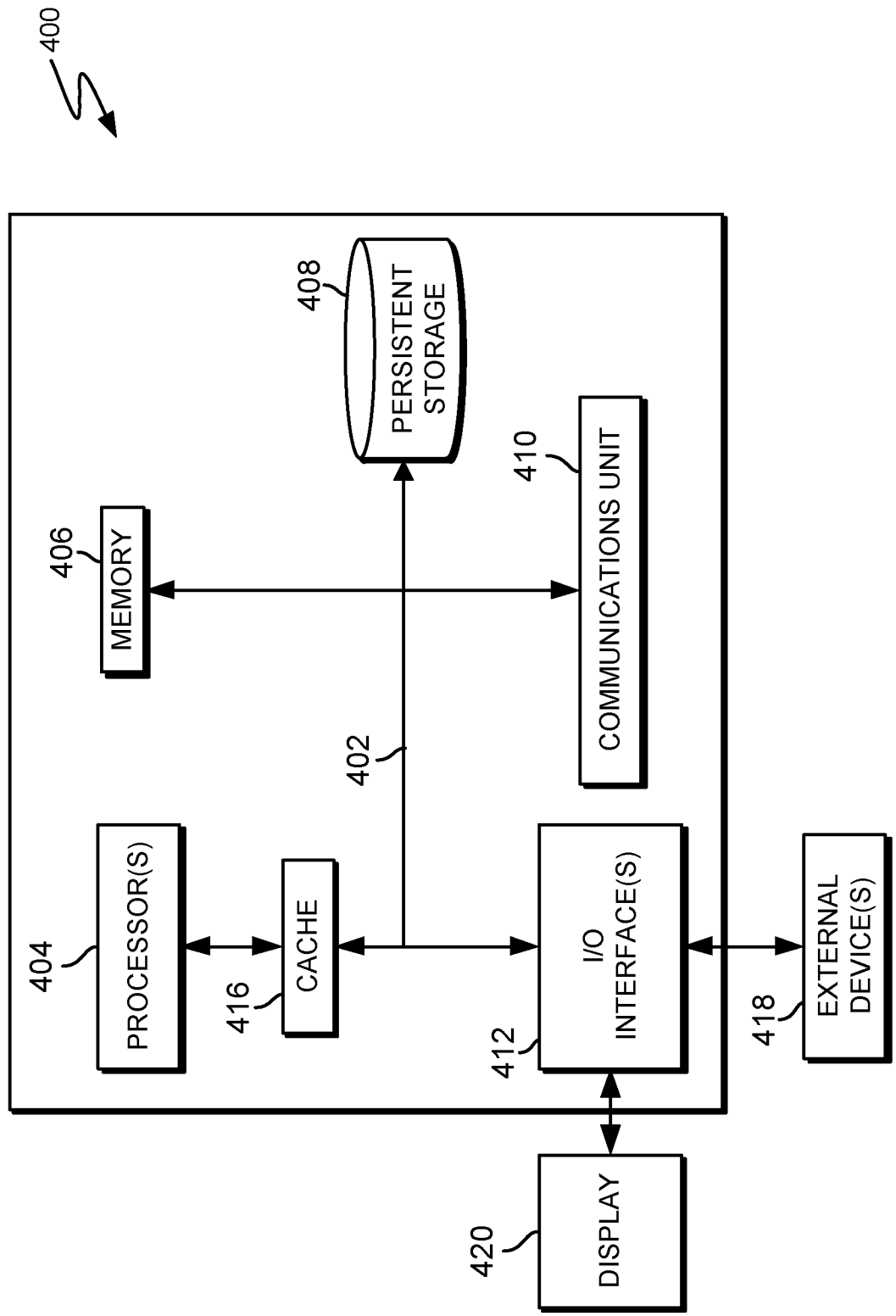
FIG. 4 is a block diagram of components of a viewing device executing the captioning modifier, in accordance with an embodiment of the present invention.

Viewing device 102 may include internal and external hardware components, as depicted and described in further detail with respect to FIG. 4.

Figure 2:
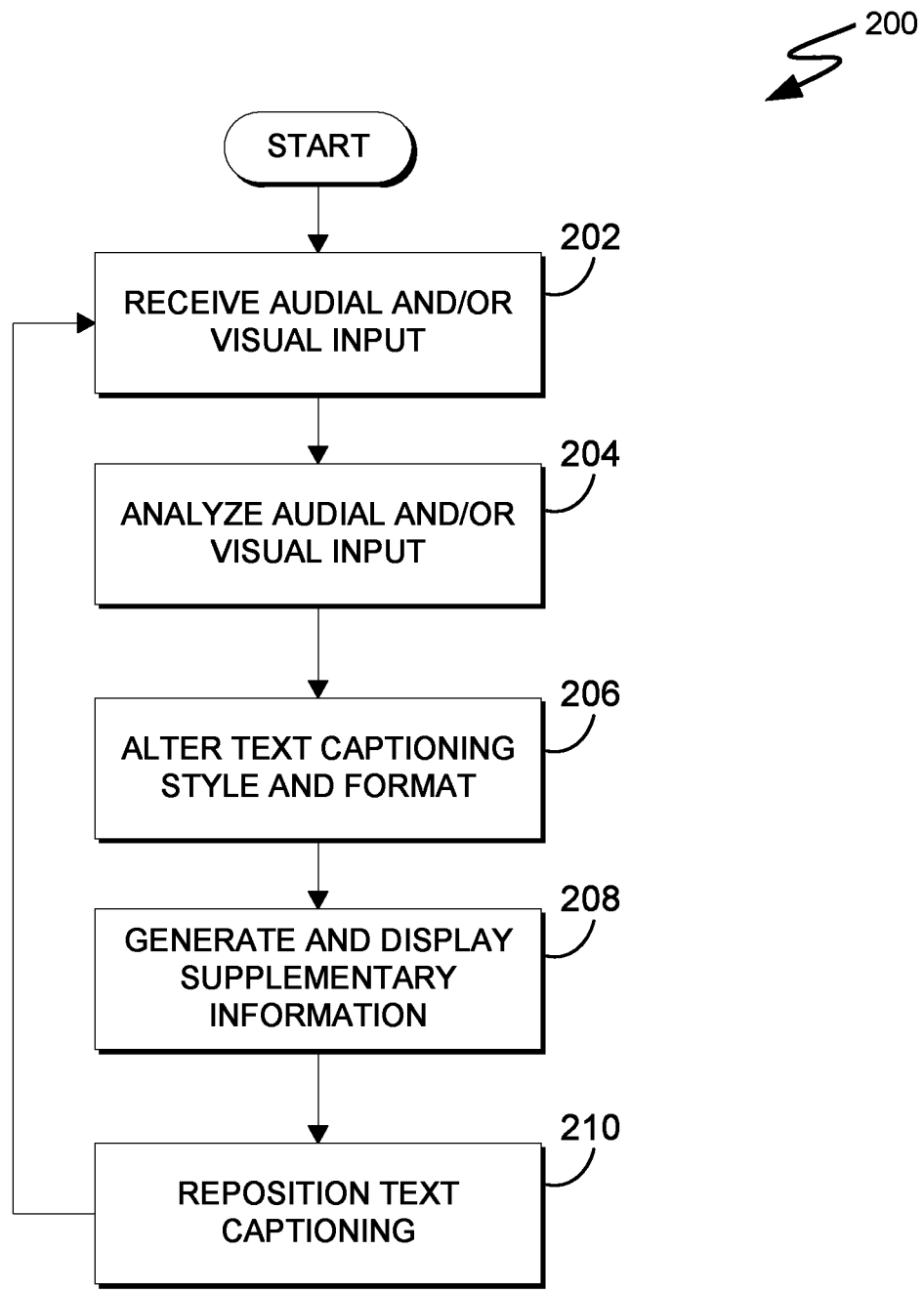
FIG. 2 is a flowchart depicting operational steps of a captioning modifier, in accordance with an embodiment of the present invention.

FIG. 2 is a flowchart 200 depicting operational steps of captioning modifier 104, in accordance with an embodiment of the present invention. The illustrative example of FIG. 2 is provided to facilitate discussion of aspects of the present invention, and it should be appreciated that FIG. 2 provides only an illustration of an embodiment of the present invention and does not imply any limitations with regard to the variations or configurations in which different embodiments may be implemented.

Input analyzer 106 receives audio and/or visual input data, associated with a video stream, from video streaming application 103 (step 202). The audio and/or visual input data can be any sounds (e.g., character dialogue and other noises) and images associated with the unfolding events and scenes of the video stream. Input analyzer 106, embodied as a cognitive computing system, analyzes the received audio and/or visual input data in real-time (step 204). The real-time analysis of video stream input data is performed to intelligently modify text captioning associated with the video stream, provided the text captioning feature is currently enabled by the viewer. The intelligent modification of text captioning by input analyzer 106 can be based, at least in part on viewer-specified preferences, or entirely based on default settings.

Input analyzer 106 runs a model that has been trained with the ability to identify objects and human actors (e.g., pre-trained models are available with deep learning frameworks such as Berkeley Vision and Learning Center (BVLC) Caffe or International Business Machines Corporation's (IBM) Watson). For each video frame or group of frames, input analyzer 106 detects the default caption positioning and relative position of captions and nearby objects. Input analyzer 106 also has a model to comprehend speech. If by speech analysis it is determined that captions are hiding an object from view and those objects were being referred to in the speech, input analyzer 106 can provide downstream alerts and events (e.g., to captioning relocator 112) so that the caption modification and repositioning may take place.

Input analyzer 106 also has a model to analyze the increasing amplitude of speech. When it detects that speech is increasing in amplitude, it has the ability to parse speech using NLP (natural language processing) models that can provide parts-of-speech taggers to identify words in speech that need highlighting or special treatment (e.g., increased font size). Input analyzer 106 processes video frames to understand object types and object locations. Object types are usually inferred using standard deep learning models such as AlexNet, ResNet and VggNet. Object position is usually captured in the form of a graph with relative pixel positions.

Input analyzer 106 processes speech content and speech amplitude so that caption related adjustments and optimizations can take place. Such speech models are available with IBM Watson API (application program interface) and may be deployed in the path of live video streams for suitable processing. Pre-trained speech models are usually deployed in the path of incoming streams.

Style modifier 108 alters the style of text captioning associated with the video stream based on the analysis of the audio and/or visual input data to improve viewer comprehension (step 206). Input analyzer 106 analyzes the video stream in real-time, detecting eventful aspects such as character emotions, volume changes and the like. Based on such analysis, style modifier 108 alters stylistic characteristics of portions of the text captioning to reflect and indicate these and other such aspects of the video stream, e.g., the font of the text captioning is bolded or italicized, the text size increases or decreases, the text color changes, etc.

As one example, for given changes in sound volume, either in a subject's voice or background noise, the text size is altered to indicate such changes. Therefore, as the sounds get louder, text size will increase (i.e., text corresponding to the sounds), and when sounds get quieter, text size will decrease. Similarly, if a character is yelling in a scene of the video stream, the corresponding text can be presented in all capital letters and at a larger size than usual, or, if they are whispering, the text size is presented as smaller than usual. If a character is placing particular emphasis on something they are saying or it is detected that they are saying something that is highly significant relative to the plot, the corresponding text can be italicized by style modifier 108. Further, the font type (e.g., Arial, Times New Roman, etc.) can be changed for a character who is speaking with an accent.

Captioning modifier 104 can provide one or more user interface (UI) components for enabling viewers to configure settings associated with text captioning modification. For example, a viewer of the video stream may configure the settings to have style modifier 108 change the text color to red or another color to indicate when a detection is made that a character is speaking angrily.

Information generator 110 generates and displays supplementary textual information, based on the real-time analysis of the video stream, to improve viewer comprehension (step 208). The supplementary information is appropriately added to the text captioning being displayed and can be information related to the context of a scene. For example, information generator 110 can add text to the text captioning which indicates the color of a certain object in a scene to which a character is speaking about, a more detailed example of which will be depicted and described subsequently with respect to FIG. 3A. This type of supplementary information added to text captioning can greatly improve the comprehension of viewers affected by color-blindness or other similar impairments.

Additionally or alternatively, supplementary information can be added which describes the relationship between two or more characters, or describes objects or events being spoken about, thus providing context to the scene to those who are just tuning in or who are otherwise unfamiliar with the plot and events associated with the video stream. Further, supplementary information added to the text captioning of a video stream can be information describing certain sounds which are not otherwise indicated by the standard, unmodified text captioning provided by a content provider. For example, text captioning is added to indicate that strong wind can be heard blowing in a scene and some shutters are banging against the side of a house.

In some embodiments, supplementary text added by information generator 110 is presented in a different size and/or font style (e.g., italicized, bold, etc.) than usual to indicate that it is supplementary information which has been added. Users of captioning modifier 104 can configure custom settings to distinguish the different text size and/or font style associated with supplementary information (added by information generator 110) from that of altered text sizes and/or font styles associated with the eventful aspects of a scene (e.g., character emotions, volume changes, etc.), which are altered by style modifier 108. Additionally, users may configure settings to specify which types of events, images or sounds (associated with a video stream) should be included as supplementary information and/or the frequency with which supplementary information is added to the text captioning.

Further, in some embodiments of the present invention, information generator 110 has the ability to provide supplemental information even if a viewer has text captioning disabled. Information generator 110 can project supplemental information in the form of text captioning to the screen to aid in understanding, even if text captioning is currently disabled. This ability would be useful in cases when a character mumbles, becomes very quiet or silently annunciates something, for example. The system detects these changes in real time and projects either determined dialogue (i.e., an estimation of what the character has said) or actual speech, depending on the scenario, as text captioning. This ability can work in conjunction with user specified preferences.

Captioning relocator 112 dynamically repositions text captioning associated with a video stream (step 210). The repositioning of text captioning is based on an analysis of where the text captioning is located on a display screen during a given scene of the video stream. Repositioning the text captioning is performed to minimize the extent to which the text captioning is blocking key visual aspects of the video stream, aspects which are significantly related to viewer comprehension of the events of an unfolding scene. Some examples of key visual aspects can be, but are not limited to, character's faces and/or bodies, scoreboards, objects in motion, visible objects being spoken about or the like.

Based on a determination by input analyzer 106 that the text captioning is at least partially obscuring one or more key visual aspects of a video stream, input analyzer 106 determines another location within a display window of the video stream where the text captioning can be repositioned to. The another location to which the text captioning can be repositioned can be a location within the video stream where there are no key visual aspects for the text captioning to block or a location where the extent to which the text captioning will be obscuring one or more key visual aspects, relative to its current position in the video stream, will be reduced. When input analyzer 106 has determined another location, input analyzer 106 communicates with captioning relocator 112 to indicate that the text captioning should be relocated, and captioning relocator 112 subsequently repositions the text captioning to the another location.

Input analyzer 106 can utilize a predetermined threshold for determining whether or not text captioning should be repositioned. For example if input analyzer 106 detects that text captioning associated with a video stream is covering more than half (i.e., 50%) of one or more key visual aspects of a scene, input analyzer 106 determines another location within the video stream to move the text captioning to. In some embodiments, input analyzer 106 determines a portion of the whole video stream (visible in a display window) which has few or no key visual aspects, such as a portion significantly comprising background scenery, e.g., 75% or more. Input analyzer 106 communicates with captioning relocator 112 to have the text captioning repositioned to the determined portion of the video stream. Further, in some embodiments, captioning modifier 104 enables users to manually reposition text captioning in a video stream with a provided UI component. Users can accomplish a manual reposition of text captioning using any suitable means of control, such as, but not limited to, directional buttons on a remote control, mouse clicks, key strokes, touching a touch screen device, etc.

Figure 3A:
FIGS. 3A-B illustrate modified text captioning and repositioned text captioning, respectively, in accordance with an embodiment of the present invention.

FIG. 3A illustrates example modified text captioning 300, in accordance with an embodiment of the present invention. In a video stream to which modified text captioning 300 corresponds, a character is asking "Where did the green hat come from?" To a viewer with color-blindness, the hat to which the character is referring may not be visually obvious and/or there may be more than one hat visible in the related scene. Information generator 110, having communicated with input analyzer 106, has added the following supplementary information, presented in parentheses and italicized, to the text captioning: (The hat on the table at right is a light green color). This supplementary information has been added to enhance viewer comprehension of the scene by directing viewers reading the text captioning to the location of the specific object being referred to, i.e., the green hat.

Figure 3B:
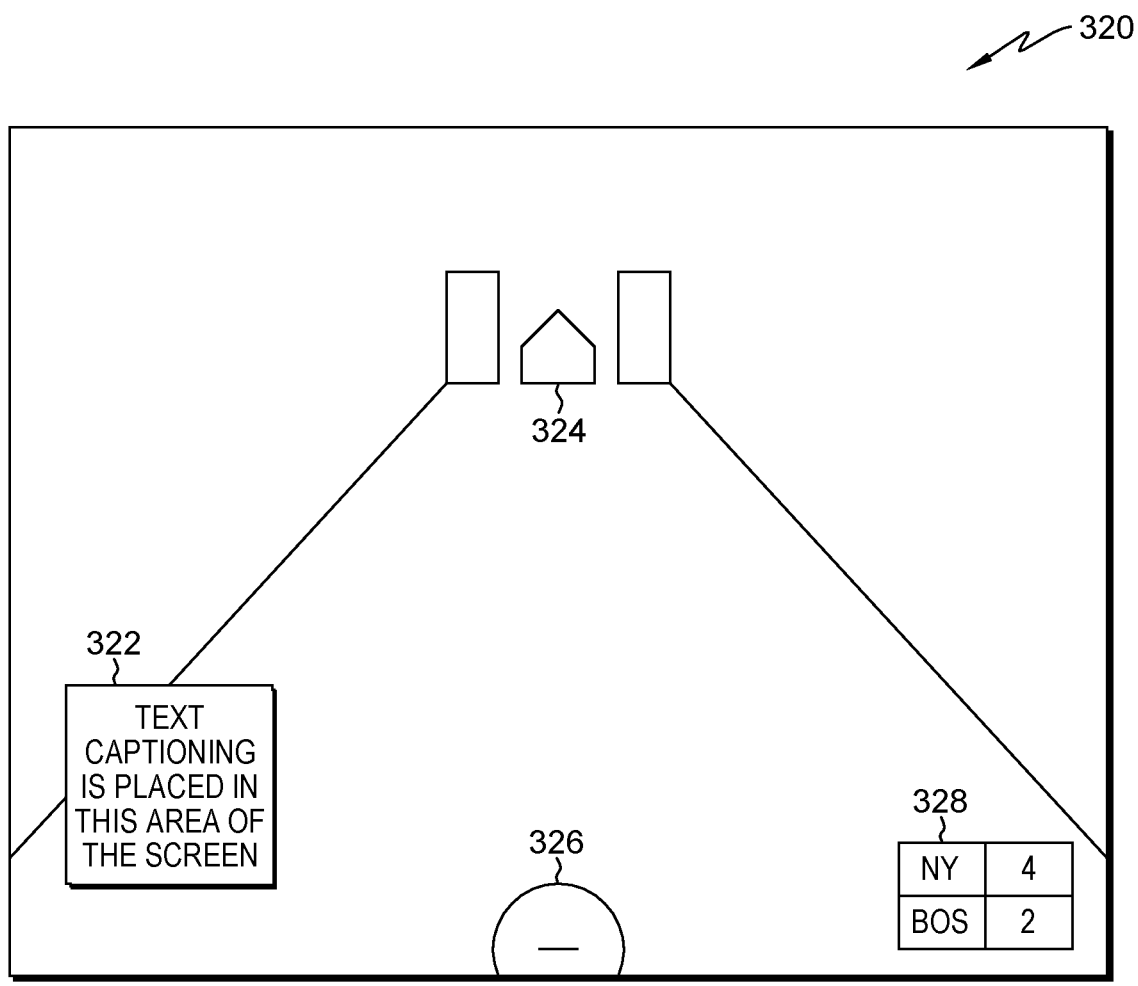

FIG. 3B depicts a streaming sporting event 320 where text captioning has been repositioned, in accordance with an embodiment of the present invention. Streaming sporting event 320 is a baseball game being viewed in a display window on a display screen associated with viewing device 102, streamed via video streaming application 103. Visible in the display window are text captioning 322, home plate 324, pitcher's mound 326 and scoreboard 328. Input analyzer 106 has received visual input data associated with the images comprising streaming sporting event 320, analyzed the scene and made a determination that text captioning 322 should be relocated. For example, text captioning 322 may have previously been located along the bottom of the screen, at least partially obscuring pitcher's mound 326 and/or scoreboard 328 (not depicted).

Captioning relocator 112 receives communication from input analyzer 106 to move text captioning 322. Captioning relocator 112 subsequently repositions text captioning 322 on the left side of a display window displaying streaming sporting event 320, as depicted. This is done so that text captioning 322 does not visually block key visual aspects of streaming sporting event 320, e.g., home plate 324, pitcher's mound 326 and scoreboard 328, thus preventing an interference to viewer comprehension of the events of the scene. It should be noted that in some embodiments, users can configure settings to control the frequency with which text captioning is repositioned.

FIG. 4 depicts a block diagram 400 of components of viewing device 102 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Viewing device 102 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Captioning modifier 104 can be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 can provide communications through the use of either or both physical and wireless communications links. Captioning modifier 104 can be downloaded to persistent storage 408 through communications unit 410.

I/O interface(s) 412 allows for input and output of data with other devices that can be connected to viewing device 102. For example, I/O interface 412 can provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., captioning modifier 104, can be stored on such portable computer readable storage media and can be loaded onto persistent storage 408 via I/O interface(s) 412. I/O interface(s) 412 also connect to a display 420. Display 420 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for modifying text captioning, the method comprising:
   receiving, by a captioning modifier program, input data associated with a video stream;
   analyzing, by the captioning modifier program, the input data, wherein analyzing includes detecting one or more human actors and processing speech content associated with the one or more human actors;
   altering, by the captioning modifier program, text captioning associated with the video stream to indicate eventful aspects based on an analysis of the input data; and
   generating, by the captioning modifier program, supplementary information associated with a scene of the video stream based on the analysis and providing the supplementary information as an addition to the text captioning, wherein:
   generating supplementary information of the scene of the video stream based on the analysis comprises describing, by the caption modifier program, a relationship between two or more characters in the video stream based on the analyzed input data; and
   providing the supplementary information as an addition to the text captioning comprises providing, by the caption modifier program, the described relationship as an addition to the text captioning.

2. The method of claim 1, further comprising:
   repositioning, by the captioning modifier program, the text captioning from a first location to a second location within the video stream.

3. The method of claim 2, wherein the repositioning is performed to minimize an extent to which the text captioning is blocking one or more key visual aspects of the video stream.

4. The method of claim 1, wherein the captioning modifier program is a cognitive analysis system which analyzes the input data for modifying the text captioning to improve viewer comprehension of the video stream.

5. The method of claim 1, wherein the input data is at least one of audio or visual information associated with the video stream, sent from a video streaming application.

6. The method of claim 1, wherein altering the text captioning to indicate eventful aspects comprises altering stylistic characteristics corresponding to portions of the text captioning associated with the eventful aspects.

7. The method of claim 2, wherein altering the text captioning, generating supplementary information and repositioning the text captioning are based, at least in part, on user-configured preferences.

\* \* \* \* \*